UNITED STATES PATENT OFFICE 1,968,341

AGENTS FOR COMBATING PESTS AND IN A PROCESS OF APPLYING SAME

Max Hartmann, Riehen, near Basel, and Hans Kägi, Basel, Switzerland, assignors to Society of Chemical Industry in Basle, Basel, Switzerland No Drawing. Application June 10, 1931, Serial No. 543,490. In Switzerland June 21, 1930

10 Claims. (Cl. 167—22)

The present invention relates to new agents for combating pests, consisting of salts of partially acylated polyamines as such, or in combination with other agents suitable for destroying pests. It comprises the said agents and their application for the purpose disclosed.

It has been found that salts of partially acylated polyamines are excellently adapted for destroying pests of any kind. By the term "pests" we understand, on the one hand, microorganisms, such as fungi, bacteria, protozoa, and the like, and, on the other hand, invertebrates, such as biting or sucking insects, worms, as for instance earth worms, molluscs, such as snails, and so on. The non-acylated amino groups of these polyamines may be present in the form of a primary, secondary or tertiary base or in the form of a quaternary ammonium compound.

Such partially acylated polyamines are inter alia disclosed in the U. S. Patents 1,534,525 and 1,737,458. As examples of such partially acylated polyamines there may be mentioned: the oleyl-diethylamino-ethylamide, the linoleyl-diethylamino-ethylamide, the stearylamino-ethylamide, the oleyl-aminopropylamide, the oleyl-N-piperidino-ethylamide, the stearyl-dimethylamino-ethylamide, the addition product of dimethyl sulfate to the oleyl-dimethylamino-ethylamide. Other partially acylated polyamines are for example such which derive from diamines containing OH-groups, for example the oleyl-β-hydroxy-γ-diethylamino-propyl-amide and the ammonium compounds thereof, as also such which derive from cyclic diamines, such as the stearyl-para-amino-dimethylaniline and the ammonium compounds deriving therefrom, such as the addition product of dimethyl-sulfate to the above compound, the 4-oleyl-amino-(diethyl-amino-ethyl-methyl)-aniline of the formula

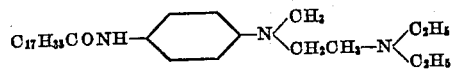

mono-acyl-piperazine, further basic urethanes, such as, for example, the dimethylester of the diethyl-amino-ethyl-imino-dicarboxylic acid and the dimethylsulfate addition product thereof, and the like. Such acylated polyamines may further be produced by partially acylating compounds, such as diethylenetriamine, triethylenetetramine,

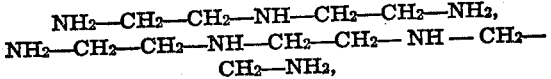

etc., and other similar compounds, and their alkylation or aralkylation products, or the ammonium compounds thereof. Among these products those are particularly valuable which derive from high molecular acids. Among these there may be mentioned palmitic acid, stearic acid, and oleic acid, lauric acid, the naphthenic acids, abietic acid, and the like.

One may use the salts of the most varied inorganic or organic acids with the partially acylated polyamines. If desired polyamine salts of such acids may be employed, which are themselves active against pests, such as for instance arsenites, arsenates, silicofluorides, benzoates, chlorobenzoates, salicylates, and so on.

One may also combine the polyamine salts with other soluble or insoluble pest destroying agents, such as for instance nicotine, helleborine, quassia or other alkaloids or soluble or insoluble metal compounds, such as for instance arsenites, arsenates, copper sulfate, copper acetate, Bordeaux mixture, organic mercury compounds, sulfur, spray oils, etc.

The salts of the partially acylated polyamines are particularly adapted for the purposes in question on account of their property of wetting and penetrating the infected parts, as well as their toxic properties for microorganisms, insects and the like. They possess further the advantage of being applicable in an acid, neutral, or alkaline medium. They may therefore be combined at liberty with acid or alkaline substances. Thus for instance the salts of diethyl-amino-ethyl-oleylamide may be applied together with salts of nicotine, or the quaternary ammonium compound of the acylated polyamine together with alkaline agents against pests, such as for instance Bordeaux mixture, imparting to these substances a considerable wetting and penetrating power and permitting their being transformed into the colloidal state. The polyamine salts may also be used in powder form either with other pulverulent inert or active substances, such as kieselguhr or calcium arsenate, sulfur etc.

What we claim is:—

1. A bactericide and fungicide consisting of salts of polyamines partially acylated with high molecular acids.

2. A bactericide and fungicide consisting of salts of polyamines partially acylated with high molecular fatty acids.

3. A bactericide and fungicide consisting of salts of aliphatic diamines partially acylated with high molecular acids.

4. A bactericide and fungicide consisting of salts of unsymmetrically alkylated aliphatic diamines partially acylated with high molecular fatty acids containing 15 to 17 carbon atoms per molecule.

5. A bactericide and fungicide consisting of salts of unsymmetrical diethylethylenediamines partially acylated with high molecular fatty acids containing 15 to 17 carbon atoms per molecule.

6. A bactericide and fungicide consisting of a salt of oleyl-diethylamino-ethyl-amide.

7. A bactericide and fungicide consisting of ammonium salts of polyamines partially acylated with high molecular acids.

8. A bactericide and fungicide consisting of an addition product of dimethylsulfate and oleyl-diethylamino-ethyl-amide.

9. A bactericide and fungicide consisting of an active constituent and an inert constituent, said active constituent consisting of a salt of a polyamine partially acylated with a high molecular acid.

10. A bactericide and fungicide comprising a salt of a polyamine partially acylated with a high molecular acid, said salt being present in the solid phase.

MAX HARTMANN.
HANS KÄGI.